May 31, 1966 E. F. KEITER 3,253,333
METHOD FOR PREPARING HOSE
Original Filed Jan. 12, 1962 4 Sheets-Sheet 1

INVENTOR.
EDWARD F. KEITER
BY

ATTORNEYS

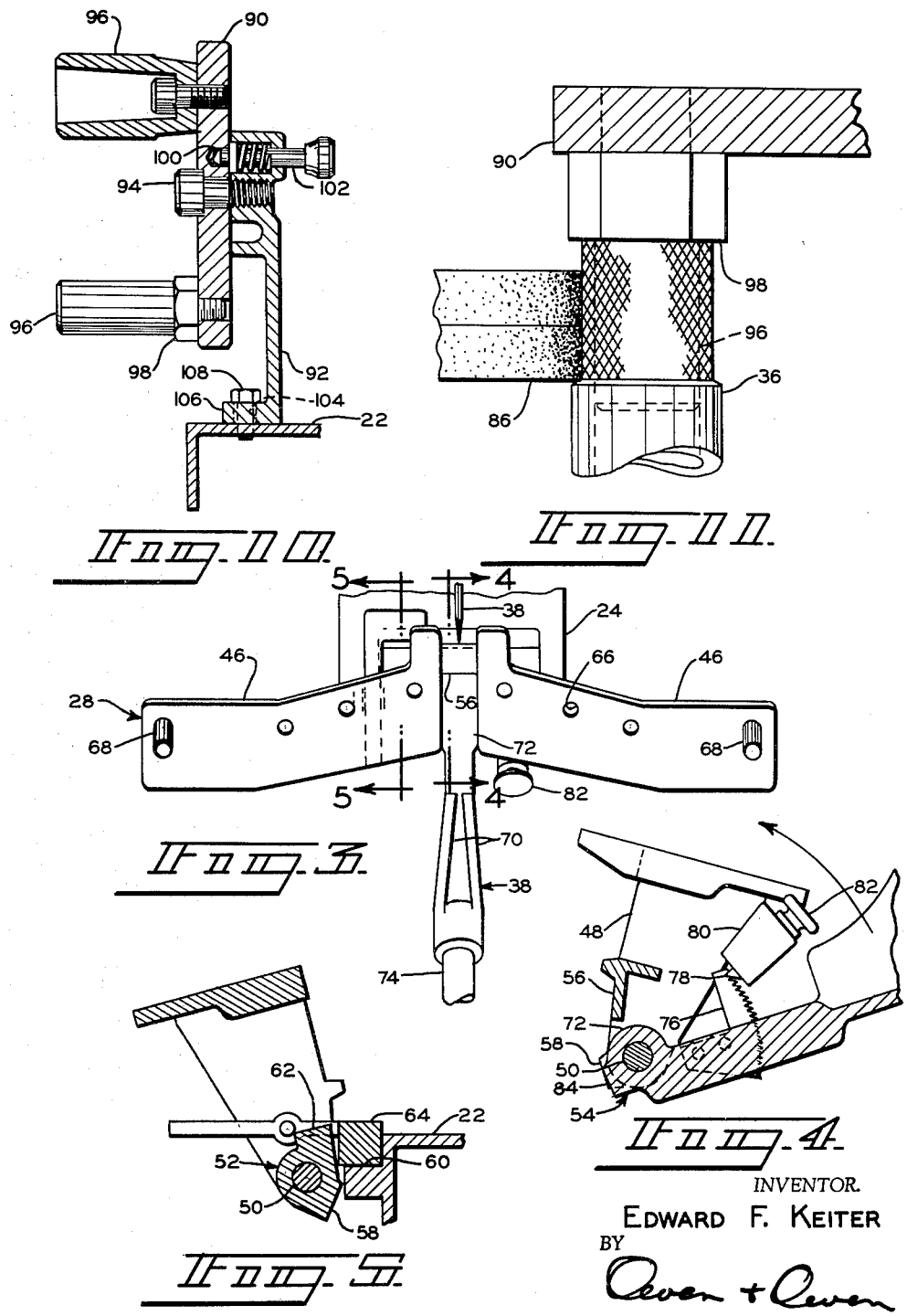

May 31, 1966  E. F. KEITER  3,253,333
METHOD FOR PREPARING HOSE
Original Filed Jan. 12, 1962  4 Sheets-Sheet 3
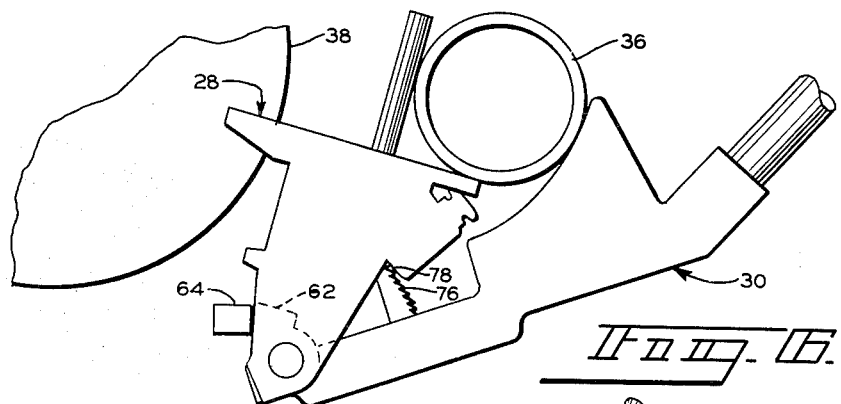
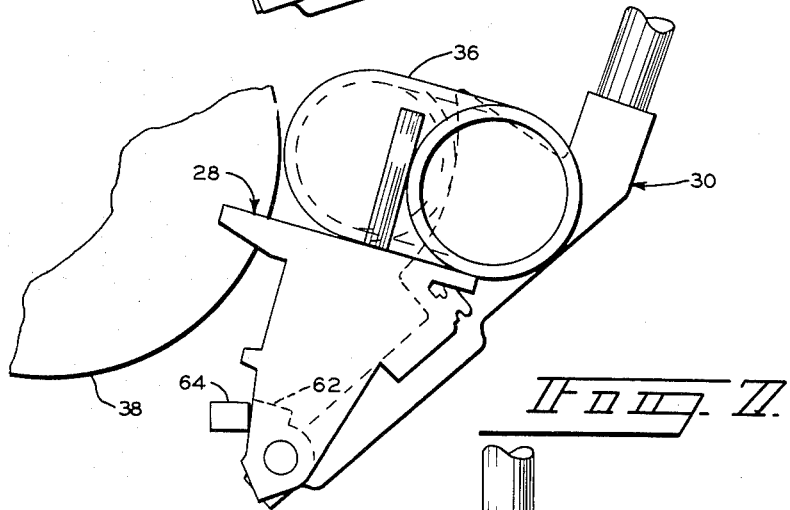
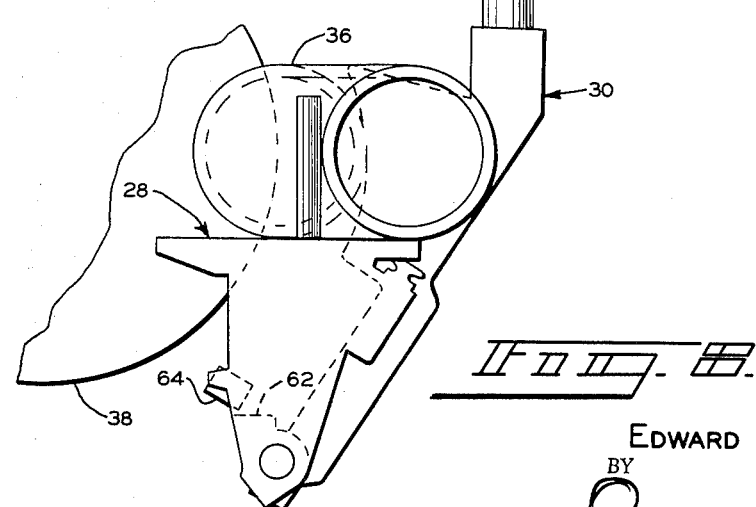
INVENTOR.
EDWARD F. KEITER
BY
Owen & Owen
ATTORNEYS May 31, 1966   E. F. KEITER   3,253,333
METHOD FOR PREPARING HOSE
Original Filed Jan. 12, 1962   4 Sheets-Sheet 4
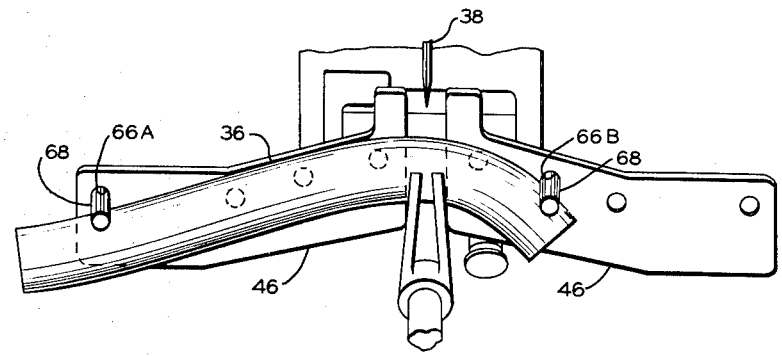
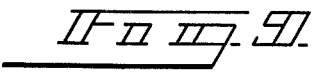
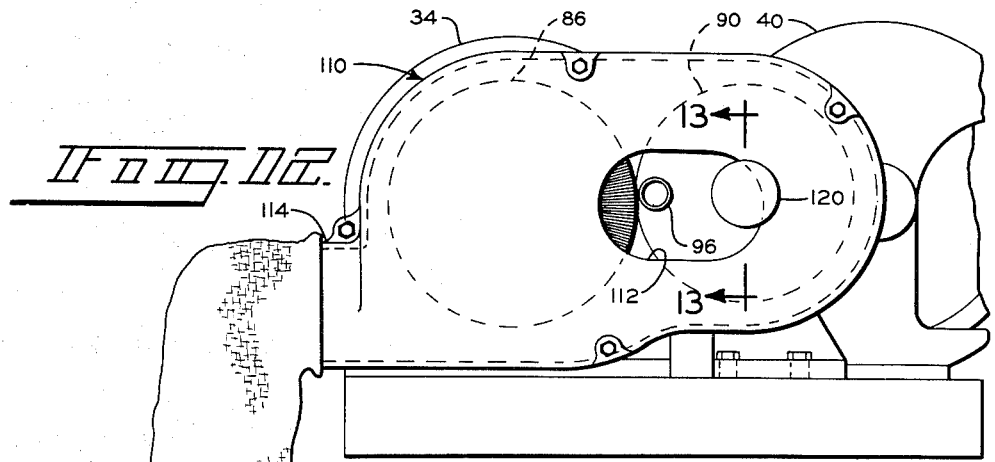
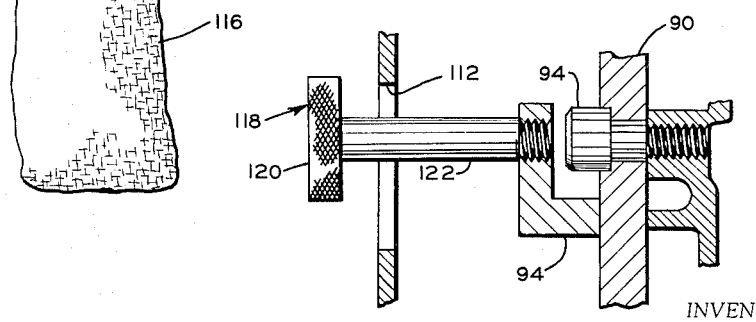
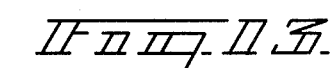
INVENTOR.
EDWARD F. KEITER
BY
Owen & Owen
ATTORNEYS United States Patent Office 3,253,333
Patented May 31, 1966

3,253,333
METHOD FOR PREPARING HOSE
Edward F. Keiter, Toledo, Ohio, assignor to Toledo-Beaver Tools, Inc., a corporation of Ohio
Original application Jan. 12, 1962, Ser. No. 165,825. Divided and this application Nov. 19, 1964, Ser. No. 419,624
5 Claims. (Cl. 29—558)

This application is a division of application Serial No. 165,825, filed January 12, 1962.

This invention relates to an improved method for preparing hose and more specifically for cutting hose to a desired length and for skiving the hose to receive a fitting.

The new method has several advantages over those heretofore known. Flexible hose of the high pressure type, with which the present invention is concerned, consists of a number of layers of rubber and wire webbing reinforcement which make it difficult to cut the hose smoothly. It has been found that the hose can be severed more easily if it is first bent slightly so as to place a portion of it in tension. Previously, this has been accomplished by holding the ends of the hose in a fixed position in front of a moving knife blade and then pushing the middle portion of the hose into the blade with the outer ends remaining in the same general position. In this manner, the hose was continually bent more as it was pushed toward and into the blade. While this technique was satisfactory for smaller hose, it was not for larger hose because the larger hose was harder to bend and was bent excessively during the cutting operation so that a true cut was not obtained perpendicular to the axis thereof.

According to the invention, the hose to be cut is given an initial bend and is then moved, while in this position, without any additional bending into the cutting blade. A smooth cut perpendicular to the axis of the hose is then obtained with the radius of the bend remaining the same throughout the cut. The extent of the bend can also be readily closely controlled and can be made the same for any diameter hose. In addition, hose of shorter length can also be more easily cut with the new method.

It is, therefore, a principal object of the invention to provide an improved method for preparing hose to receive a fitting, as outlined above.

Other objects and advantages of the invention will be apparent from the following detailed description of a preferred embodiment thereof, reference being made to the accompanying drawing, in which:

FIG. 3 is a top view of a portion of the machine of FIGS. 1 and 2, showing a hose-carrying table, the hose handle, and a portion of a cutting blade;

FIG. 4 is a view in cross section taken along the line 4—4 of FIG. 3;

FIG. 5 is a view in cross section taken along the line 5—5 of FIG. 3;

FIGS. 6–8 are somewhat schematic side views in elevation of the components shown in FIG. 3, in progressive positions during a cutting operation;

FIG. 9 is a top view similar to FIG. 3 of the hose-carrying table with pegs associated therewith in slightly different positions;

FIG. 10 is a view in vertical cross section taken along the line 10—10 of FIG. 2;

FIG. 11 is a view in horizontal cross section taken along the line 11—11 of FIG. 2;

FIG. 12 is a side view in elevation of a portion of a modified hose machine; and FIG. 13 is a view in cross section taken along the line 13—13 of FIG. 12.

Figure 1:
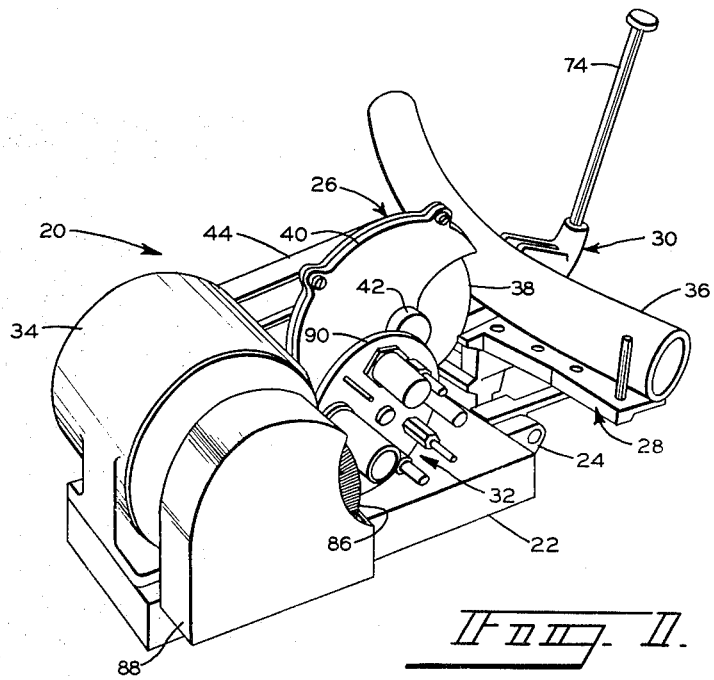
FIG. 1 is a view in perspective of a hose machine embodying the principles of the invention.

Referring to the drawings, and more particularly to FIG. 1, a hose machine embodying the principles of the invention is indicated at 20 and includes a base 22, a base extension or ears 24, a cutting unit 26, a hose-carrying table 28, a cut-off arm 30, a skiving unit 32, and a motor 34.

In the overall operation of the hose machine 20, a hose 36 is first cut to a desired length by the cutting unit 20. With the hose 36 of the proper length, a fitting is then fastened to at least one end thereof. However, since, as previously mentioned, the hose consists of a number of alternate layers of rubber and woven wire webbing reinforcement, with the outer layer being rubber, the outer layer must be removed to provide an adequate connection between the fitting and the fastener. This is accomplished by the skiving unit 32 which removes the outer layer of rubber to expose the wire reinforcement and to establish a good base for the fitting.

The cutting unit 26 includes a thin, rotating blade 38 which is rotatably mounted in a guard 40 by bearings 42 with the guard 40 being suitably supported on the base 22. The blade 38 is driven by the motor 34 through sheaves (not shown) and a timing belt 44 or by other suitable means. The blade 38 is of a known design which enables it to cut the wire webbing reinforcement in the hose as well as the rubber, as is known in the art.

The hose-carrying table 28 includes two symmetrical sections 46 (FIG. 3) which have depending legs 48 (FIG. 4) rotatably mounted on a shaft 50 on opposite sides of the blade 38. The shaft 50, which is supported by the base extension 24, is connected to the left-hand leg 48 through a hub 52 (FIG. 5), which will be discussed in more detail subsequently, and to the right-hand leg 48 through a hub 54 (FIG. 4). The legs 48 of the sections 46 are connected by a web 56 (FIGS. 3 and 4) so that the two sections 46 move together as a unit. The web 56 is positioned so as to pass below the cutting blade 38 when the table 28 is moved toward it, and is also positioned near the front edges of the legs 48 so as not to interfere with the cut-off arm 30 when it is moved forwardly relative to the table 28. The rearward rotational movement of the table 28 is limited by stop shoulders 58 on the hubs 52 and 54, which shoulders 58 cooperate with stop projections 60 constituting part of the base 22.

The table 28 can be prevented from any substantial forward movement by means of a lock shoulder 62 on the hub 52 which cooperates with an L-shaped locking lever or member 64 which is pivotally supported by a portion of the base extension 24. A front portion of the lever 64 lies between the lock shoulder 62 and the base 22 when in its normal position and prevents movement of the hub 52 and the table 28 until the front portion of the lock member 64 is raised above the shoulder 62 by depressing the rear of the member.

The table sections 46 have a plurality of openings 66 into which pegs 68 are inserted. The pegs 68 hold spaced portions of the hose 36, as will be more apparent subsequently, and can be placed closer together or farther apart to accommodate hoses of various lengths and diameters. In general, the pegs are placed farther apart for hoses of larger diameter and are placed closer together for hoses of smaller diameter. As the pegs 68 are closer together, they are positioned forwardly on the table so that the foremost portion of the hose will always be in about the same position regardless of which of the peg receiving openings 66 are used.

The particular positioning of the openings 66 has another advantage in that shorter pieces of hose can easily be cut from longer lengths. Thus, as shown in FIG. 9, the hose 36 can be positioned asymmetrically when the pegs 68 are in openings designated 66A and 66B with the pegs 68 in the hole 66B being much closer to the plane of the blade 38 than is the peg 68 in the holes 66A. Thus, a short piece of the hose, represented to the right of the blade 38 in FIG. 9, can easily be cut from the overall hose regardless of its length.

The cut-off arm 30 includes a pair of hose-contacting flanges 70 which are spaced slightly apart so as to pass on either side of the blade 38. The arm 30 has a hub 72 rotatably mounted on the shaft 50 between the legs 48 of the table 28 and also has a handle 74 for moving the arm 30. To one side of the arm 30 is attached a ratchet plate 76 having a plurality of teeth thereon which are engaged by a spring-loaded pawl 78 mounted in a housing 80 which is attached to or a part of the table 28. The teeth on the ratchet plate 76 are designed to enable the plate 76 to move in a counterclockwise direction, as shown in FIG. 4, but not in the opposite direction. Thus, the cut-off arm 30 can be moved in a counterclockwise direction by means of the handle 74, even when the lock lever 64 prevents movement of the table 28 in the same direction, but the cut-off arm cannot then move in the opposite direction until the pawl 78 is disengaged from the teeth of the plate 76 by means of a knob 82 which can be grasped by an operator and pulled outwardly. If desired, the pawl 78 can be pulled and disengaged from the teeth of the ratchet plate 76 for all operations of the machine 20.

In the operation of the cutting unit 26, the table 28, and the cut-off arm 30, the hose 36 to be cut in two is first placed on the table 28 behind the pegs 68 (see FIG. 6). The cut-off arm 30 is then moved in a counterclockwise direction by means of the handle 74, with the flanges 70 contacting an intermediate part of the hose 36 and moving it forwardly to form a bend therein (FIG. 7). During this movement of the cut-off arm 30, the table 28 is stationary because the locking member 64 cooperates with the shoulder 62 of the hub 52 to prevent forward movement to the table. As the cut-off arm 30 is moved, the ratchet plate 76 moves past the spring-loaded pawl 78 until the cut-off arm 30 is urged in the opposite direction, at which time the pawl 78 engages one of the teeth of the plate 76 and prevents the opposite movement. When the hose 36 is bent to the desired shape, the handle 74 is simply released with the hose 36 then urging the cut-off arm 30 in the opposite direction but, since this movement is prevented by the pawl 78, the hose remains in its bent position. At this point, the forward extremity of the hose 36 has not yet reached the blade 38, at least in most instances.

With the desired bend in the hose 36, the lock member 64 is then released by pushing the rear downwardly to raise the front above the lock shoulder 62 with the result that the hose 36, the table 28, and the cut-off arm 30 can move forwardly toward the blade 38 as a unit. The hose 36 thereby is not bent any further and retains substantially the same shape as it is cut in two by the blade 38 (FIG. 8). After the cut is completed, the handle 74 is moved rearwardly along with the cut-off arm 30 which also moves the table 28 in the same direction. When the table 28 reaches its rear position, as determined by the stop shoulder 58 and the projection 60, the operator grasps the knob 82 to disengage the pawl 78 from the teeth of the plate 76. The cut-off arm 30 can then be returned to its rear position which is determined by a stop shoulder 84 (FIG. 4) which cooperates with a suitable projection on the base 22 similarly to the stop shoulders 58 and the projection 60. The pawl 78 is then returned to engagement with the plate 76 and the unit is ready for the next operation.

As previously discussed, the hose 36, once bent to its desired position, remains substantially in that position as the cutting operation proceeds so that a true, smooth cut is obtained. The hose does not bend any further during the cutting operation as has been true of machines and methods of this nature found in the prior art.

When the hose has been cut to the desired length, and at least one end of it is to receive a hose fitting, the skiving unit 32 is employed. The unit 32 includes a circular brush 86 (FIGS. 1, 2 and 11) with wire bristles which is rotated by means of the motor 34, being mounted directly on a shaft thereof. A suitable guard 88 is located around the rotary brush 86 to catch the rubber particles removed from the hose 36. Adjacent and slightly behind the brush 86 is an indexing plate 90 which is rotatably attached to a bracket 92 (FIG. 10) by a screw 94, with the bracket 92 being supported on the base 22. A plurality of mandrels 96 are affixed to the indexing plate 90 and are positioned on the plate 90 so that they are properly spaced from the circular brush 86 when the plate 90 is rotated; the outer layer of rubber on the hose 36, when inserted on the appropriate mandrel, can then be removed by the brush 86 (FIG. 11). The mandrels 96 are also equipped with shoulders 98 which limit the axial movement of the hose 36 on the mandrels 96 so that only a predetermined length of the outer layer of rubber will be removed. This length varies for different hose diameters so that each of the shoulders 98 varies as to the distance it is located from the plate 90. The largest of the mandrels 96 has no shoulder 98 because a portion of the plate 90 serves this purpose. Any number of mandrels can be employed, depending on the number of sizes of hoses to be used.

The indexing plate 90 is equipped with a plurality of appropriately spaced recesses 100 (FIG. 10) which cooperate with a spring-loaded index plunger 102 to hold the plate in its various indexed positions with the appropriate mandrel spaced adjacent the brush 86.

In the operation of the skiving unit 32, after the hose 36 is severed, the index plunger 102 is pulled from the recess 100 and the index plate 90 is rotated until the appropriate mandrel 96 is located adjacent the brush 86. The plunger 102 is then released so as to once again project into one of the recesses 100 and hold the proper mandrel in place. One end of the hose 36 is then pushed onto the mandrel toward the shoulder 98 and is rotated during this movement. Because of the spacing of the mandrel 96, the outer layer of rubber on the hose 36 is removed as the hose is rotated so that by the time the end of the hose abuts the shoulder 98, the hose is stripped down to its first layer of metal reinforcing webbing. The hose is then simply removed and the proper fitting applied thereto.

The skiving unit 32 is provided with slots 104 in a base flange 106 to compensate for wear of the brush 86. The entire indexing plate 90 can then be moved toward and away from the brush 86 by loosening screws 108 which extend through the slots 104.

Figure 2:
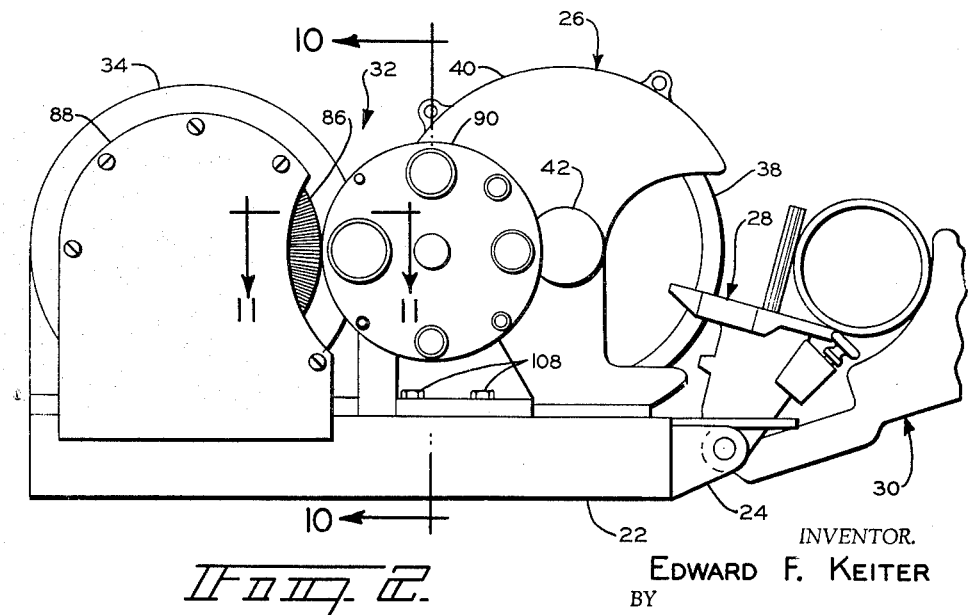
FIG. 2 is a side view in elevation of the machine shown in FIG. 1, with a handle thereof shown in a different position.

A portion of a modified hose cutting machine is shown in FIG. 12, the machine in this instance being substantially the same as that shown in FIGS. 1 and 2 except for a guard 110 which is located around both the brush 86 and the indexing wheel 90. The guard 110 has a central opening 112 through which a hose to be skived can be inserted for positioning on one of the mandrels 96. The opening 112 is elongated to compensate for change in the position of the indexing wheel 90 as the brush 86 wears.

The guard 110 also has an exit neck 114 to which is attached a suitable dust bag 116. The rotation of the brush 86 produces an unexpectedly large impeller effect so that the rubber particles from the hose are ejected very effectively into the bag 116. A completely particle-free operation is thereby attained. The guard 88 can also be provided with a neck and dust bag although some particles will still escape the guard.

In this instance, the indexing wheel 90 is provided with an extended indexing handle 118 which includes a knob 120 located outside the guard 110 and a shaft 122 which extends through the opening 112. The shaft 122 is suitably affixed to a bracket 124 which, in turn, is suitably affixed to the indexing wheel 90 to one side of the screw 94 at the center of rotation thereof. In this manner, the indexing wheel 90 can be rotated when the pin 102 is released by means of the knob 120, without being hampered by the guard 110.

Various modifications of the above described embodiment of the invention will be apparent to those skilled in the art and it is to be understood that such modifications can be made without departing from the scope of the invention, if they are within the spirit and tenor of the accompanying claims.

What I claim is:

1. A method of cutting high pressure hose into two pieces, which method comprises positioning the hose in front of a moving knife blade, with the axis of the hose perpendicular to the knife blade, bending the hose in an arc with the center of the arc being away from the knife blade, and moving the hose into and past the cutting edge of the blade while maintaining the arc substantially constant.

2. A method of cutting high pressure hose into two pieces, which method comprises positioning the hose in front of a moving knife blade, with the axis of the hose perpendicular to the knife blade, holding spaced portions of the hose on opposite sides of said blade stationary while pushing a center portion of said hose toward the knife blade to form a desired bend in said hose, and moving the entire bent hose as a unit into and past the cutting edge of the blade while maintaining the curvature of the hose substantially constant.

3. A method of cutting high pressure hose in a hose-cutting machine, which method comprises laying the hose on a table in front of a moving knife blade, with the axis of the hose perpendicular to the knife blade, holding spaced portions of the hose in fixed positions on each side of the blade, moving a cut-off arm from a position behind the hose into contact with the hose, pushing the cut-off arm farther to bend the hose while maintaining the table stationary, releasing the table, and pushing the cut-off arm farther to move the hose through a cutting edge of the blade with the bend of the hose being substantially constant.

4. A method of preparing a high pressure hose to receive a fitting, which method comprises positioning the hose in front of a moving knife blade, bending the hose in an arc with the center of the arc being away from the knife blade, moving the hose into and past the cutting edge of the blade while maintaining the arc substantially constant, and rotating a cut end of the hose on an axis spaced a predetermined distance from a skiving brush, whereby said brush removes an outer layer of said hose to enable a fitting to be engaged therewith.

5. A method of cutting a relatively short piece from a high pressure hose by means of a hose cutting machine, which method comprises laying the hose on a table in front of a moving knife blade, with the axis of the hose perpendicular to the knife blade, and with the length of the short piece lying on one side of the knife blade, holding spaced portions of the hose in fixed positions on each side of the blade, with the held portion on the short piece side of the knife blade being closer to the knife blade than the held portion on the opposite side, moving a cut-off arm from a position behind the hose into contact with the hose, pushing the cut-off arm farther to bend the hose while maintaining the table stationary, releasing the table, and pushing the cut-off arm farther to move the hose through a cutting edge of the blade with the bend of the hose being substantially constant.

References Cited by the Examiner

UNITED STATES PATENTS

| | | | |
|---|---|---|---|
| 2,021,421 | 11/1935 | Mason | 15—88 |
| 2,303,824 | 12/1942 | Comins | 29—76 |
| 3,066,564 | 12/1962 | Carpenter | 83—411 X |

JOHN F. CAMPBELL, *Primary Examiner.*

THOMAS H. EAGER, *Examiner.*